United States Patent
Hasegawa et al.

(10) Patent No.: US 10,178,850 B2
(45) Date of Patent: Jan. 15, 2019

(54) COVER MEMBER FOR PET TOILET SEATS AND PET TOILET USING SAME

(71) Applicant: UNICHARM CORPORATION, Shikokuchuo-shi, Ehime (JP)

(72) Inventors: Satoshi Hasegawa, Kanonji (JP); Takayuki Matsuo, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/520,479

(22) PCT Filed: Oct. 19, 2015

(86) PCT No.: PCT/JP2015/079434
§ 371 (c)(1),
(2) Date: Apr. 20, 2017

(87) PCT Pub. No.: WO2016/067951
PCT Pub. Date: May 6, 2016

(65) Prior Publication Data
US 2017/0311563 A1    Nov. 2, 2017

(30) Foreign Application Priority Data
Oct. 31, 2014    (JP) .................................. 2014-223786

(51) Int. Cl.
*A01K 1/01*    (2006.01)
*A01K 1/015*   (2006.01)
*A01K 23/00*   (2006.01)

(52) U.S. Cl.
CPC ............. *A01K 1/0107* (2013.01); *A01K 1/01* (2013.01); *A01K 1/015* (2013.01); *A01K 23/00* (2013.01)

(58) Field of Classification Search
CPC ..... A01K 1/0107; A01K 1/015; A01K 1/0125
(Continued)

(56) References Cited

U.S. PATENT DOCUMENTS 3,358,647 A * 12/1967 Wilson ................. A01K 1/0107
119/169
3,386,417 A    6/1968 Machowski
(Continued)

FOREIGN PATENT DOCUMENTS

JP    2005-287367 A    10/2005
JP    2007-14321 A     1/2007
(Continued)

OTHER PUBLICATIONS

International Search Report in International Application No. PCT/JP2015/079434, dated Jan. 19, 2016.

*Primary Examiner* — Magdalena Topolski
(74) *Attorney, Agent, or Firm* — Hauptman Ham, LLP

(57) ABSTRACT

In a cover member for pet toilet seats, a base section has on the upper surface thereof a sloped surface that gradually slopes downwards from a first end towards a second end. The sloped surface has: a first sloped section arranged on the first end side of the base section; and a second sloped section that is positioned further on the second end side than the first sloped section, slopes to an end edge of the second end, and has a greater slope than the first sloped section. An end edge section has a sloped surface on the upper surface side thereof that gradually slopes downwards as same becomes further removed from the first end of the base section.

6 Claims, 5 Drawing Sheets

(58) Field of Classification Search
USPC .................................. 119/165, 161, 169, 168
See application file for complete search history.

(56) References Cited

U.S. PATENT DOCUMENTS

| | | | | |
|---|---|---|---|---|
| 6,550,423 | B1* | 4/2003 | Pope | A01K 1/0107 |
| | | | | 119/161 |
| 7,128,023 | B2* | 10/2006 | Otsuji | A01K 1/0107 |
| | | | | 119/169 |
| 8,220,622 | B1* | 7/2012 | Lewis | A01K 1/0107 |
| | | | | 119/168 |
| 2002/0112669 | A1* | 8/2002 | Holt, Jr. | A01K 1/0157 |
| | | | | 119/161 |
| 2006/0137620 | A1* | 6/2006 | Joy | A01K 1/0107 |
| | | | | 119/165 |
| 2011/0052838 | A1* | 3/2011 | Levkovitch | A01K 1/0125 |
| | | | | 428/12 |
| 2013/0327278 | A1* | 12/2013 | Reichert | A01K 1/0114 |
| | | | | 119/167 |
| 2014/0360436 | A1* | 12/2014 | Kong | A01K 1/0107 |
| | | | | 119/163 |
| 2016/0302380 | A1 | 10/2016 | Hasegawa et al. | |

FOREIGN PATENT DOCUMENTS

| | | | | |
|---|---|---|---|---|
| JP | 3154900 U | 10/2009 | | |
| JP | 2010-233583 A | 10/2010 | | |
| JP | 2011-92015 A | 5/2011 | | |
| JP | 2012-509057 A | 4/2012 | | |
| JP | 2013202028 A * | 10/2013 | ........... | A01K 1/0107 |
| JP | 5655132 B1 | 1/2015 | | |
| WO | WO-2009014335 A2 * | 1/2009 | ........... | A01K 1/0107 |
| WO | 2010003794 A1 | 1/2010 | | |

* cited by examiner

COVER MEMBER FOR PET TOILET SEATS AND PET TOILET USING SAME

RELATED APPLICATIONS

The present application is a National Phase of International Application Number PCT/JP2015/079434, filed Oct. 19, 2015, which claims priority from Japanese Application Number 2014-223786, filed Oct. 31, 2014.

TECHNICAL FIELD

The present invention relates to a cover member that presses a toilet sheet, as an absorbent article that absorbs excreted fluid from a pet such as a dog, down onto a floor surface, and to a pet toilet using the same.

BACKGROUND ART

Toilet sheets are widely known as absorbent articles comprising a liquid-permeable top sheet, a liquid-impermeable back sheet, and an excreted fluid-absorbing absorbent body disposed between the top sheet and the back sheet, for treatment of excreta of pets such as dogs that are raised indoors.

Because such toilet sheets shift their position and become wrinkled, or sometimes folded over, when the pet steps on the top surface, measures have been devised to prevent such positional shifting or folding of the toilet sheet by means of pressing a frame body onto the top surface of the toilet sheet, as in the pet toilets disclosed in PTL 1 and PTL 2, for example.

However, with the pet toilet described in PTL 1, the frame body has a generally horizontal flat top surface, and therefore when pet urine and the like falls onto the frame body, it tends to remain on the frame body due to the action of surface tension, releasing bad odor or possibly being flung out onto the floor surface by movement of the pet.

Particularly in the case of dogs, which tend to excrete urine at the section of the toilet sheet near the frame body of the pet toilet, urine is more likely to contact with the frame body and result in the problem of urine remaining on the frame body.

In the frame body of the pet toilet of PTL 2, the sections extending from the top side of the frame body that faces upward toward the outer perimeter direction of the frame body are larger than the sections extending from the top side toward the direction of the inner perimeter edge, in a plane view. Consequently, even if urine contacts with the frame body, the urine is highly likely to contact with sections where it can more easily flow out in the outer perimeter direction, which may result in movement of the urine over the exterior of the toilet sheet and fouling of the floor.

The construction is such that the toilet sheet is spread over a base plate, in the case of the toilet described PTL 1, while the toilet sheet is spread over a pan-shaped tray in the case of the toilet described in PTL 2, and therefore the overall thickness of the toilet is increased by the amount of the base plate or tray.

If the thickness of the pet toilet is too large, the pet may perceive it as an extraneous object, possibly making the pet hesitant to step over the frame body and enter the toilet.

This has sometimes led to the pet failing to excrete in the pet toilet, and fouling the floor instead.

CITATION LIST

Patent Literature

[PTL 1] Utility Model Registration No. 3154900
[PTL 2] Japanese Unexamined Patent Publication No. 2010-233583

SUMMARY OF INVENTION

Technical Problem

The technical problem of the present invention is to provide a cover member for a pet toilet sheet, and a pet toilet, that are of limited height overall, while allowing pet urine that has contacted with it to easily flow down in the direction of the toilet sheet.

Solution to Problem

In order to solve this problem, the cover member for a pet toilet sheet according to the present invention is as follows.

(1) A cover member for a pet toilet sheet, to be mounted on a pet toilet sheet that is spread over the floor surface and absorbs excreted fluid from a pet, and serves to press the toilet sheet in a partially covered state, the cover member comprising a base section having a first end and a second end located in the reciprocal direction relative to the first end in the horizontal direction, and an edge section provided along the edge of the first end, wherein the base section has, on the top surface, an inclined surface that gradually declines from the first end toward the second end, to allow movement of excreted fluid from the pet toward the toilet sheet, the inclined surface having a first inclined section that is inclined from the edge of the first end toward the second end, the edge of the first end being connected to the edge section, and a second inclined section located more toward the second end side than the first inclined section, with its first end side connected to the first inclined section and inclined to the edge of the second end, the second inclined section having a greater inclination than the first inclined section, and the connecting section between the first inclined section and the second inclined section being curved in a convex manner upward from the first end side toward the second end side, while the distance from the end portion of the second inclined section on the first end side to the second end edge is smaller than the distance from the first end edge of the first inclined section to the end portion on the second end side, and the edge section has an inclined surface on the top surface side, that gradually declines as it recedes from the first end of the base section.

(2) The cover member for a pet toilet sheet according to (1) above, wherein the second inclined section has a curved shape that is curved in a convex manner upward from the first end of the base section across to the edge of the second end.

(3) The cover member for a pet toilet sheet according to (2) above, wherein the second inclined section has, on the side of the first end of the base section, a first end side inclined section with a larger inclination than the first inclined section, and a second end side inclined section, having a larger inclination than the first end side inclined section, located more toward the side of the second end of the base section than the first end side inclined section and extending up to the edge of the second end.

(4) The cover member for a pet toilet sheet according to any one of (1) to (3), wherein the edge section has, on the side of the first end of the base section, a standing wall section that stands upward from the edge of the first end on the inclined surface of the base section, and the base end section of the standing wall section has a curved shape that continues to the edge of the first end of the inclined surface of the base section and is curved in a convex manner downward.

(5) The cover member for a pet toilet sheet according to any one of (1) to (4), wherein the height of the cover member at the location where the height in the vertical direction of the cover member is greatest is 15 to 20% of the distance from the edge of the second end of the base section to the edge of the base section on the side opposite the first end at a nearest portion of the edge section.

(6) The cover member for a pet toilet sheet according to any one of (1) to (5), wherein at the edge section, the distance between the connecting section with the first end of the base section and the edge on the side opposite the first end, in a plane view, is smaller than the distance between the edge of the first end of the base section and the edge of the second end, in a plane view.

(7) The cover member for a pet toilet sheet according to any one of (1) to (6), wherein the cover member is a frame in which the second end of the base section is situated on the inner perimeter side.

Also, as a design to solve the aforementioned problem, the pet toilet of the present invention is as follows.

(8) A pet toilet comprising the cover member according to any one of (1) to (7), and a pet toilet sheet having a liquid-permeable top sheet and liquid-impermeable back sheet, and a liquid-absorbing absorbent body disposed between the top sheet and back sheet, the cover member being mounted on the top surface thereof.

Advantageous Effects of Invention

According to the present invention, the cover member has an inclined surface formed on the top surface of the base section, with a first inclined section located on the first end side, and a second inclined section located on the second end side, with a larger inclination than the first inclined section. Also, the connecting section between the first inclined section and the second inclined section is formed in a shape curved in a convex manner upward from the first end side toward the second end side, and the distance from the first end side of the second inclined section to the edge of the second end is formed smaller than the distance from the edge of the first end of the first inclined section to the second end side.

This allows excreted fluid such as urine, that has been excreted from a pet and dropped down onto the base section of the cover member, to flow down the first inclined section and second inclined section toward the second end side, while minimizing the effect of surface tension of the excreted fluid, so that it can drop down and be absorbed onto the toilet sheet.

Furthermore, since the cover member is mounted on the toilet sheet that has been spread onto a floor surface, and presses the toilet sheet in a partially covered state, the height of the toilet as a whole can be more easily reduced to present less of an obstacle to entrance of a pet such as a dog into the toilet, compared to a conventional type in which the toilet sheet is mounted on a pan-shaped tray.

DESCRIPTION OF EMBODIMENTS

Figure 1:
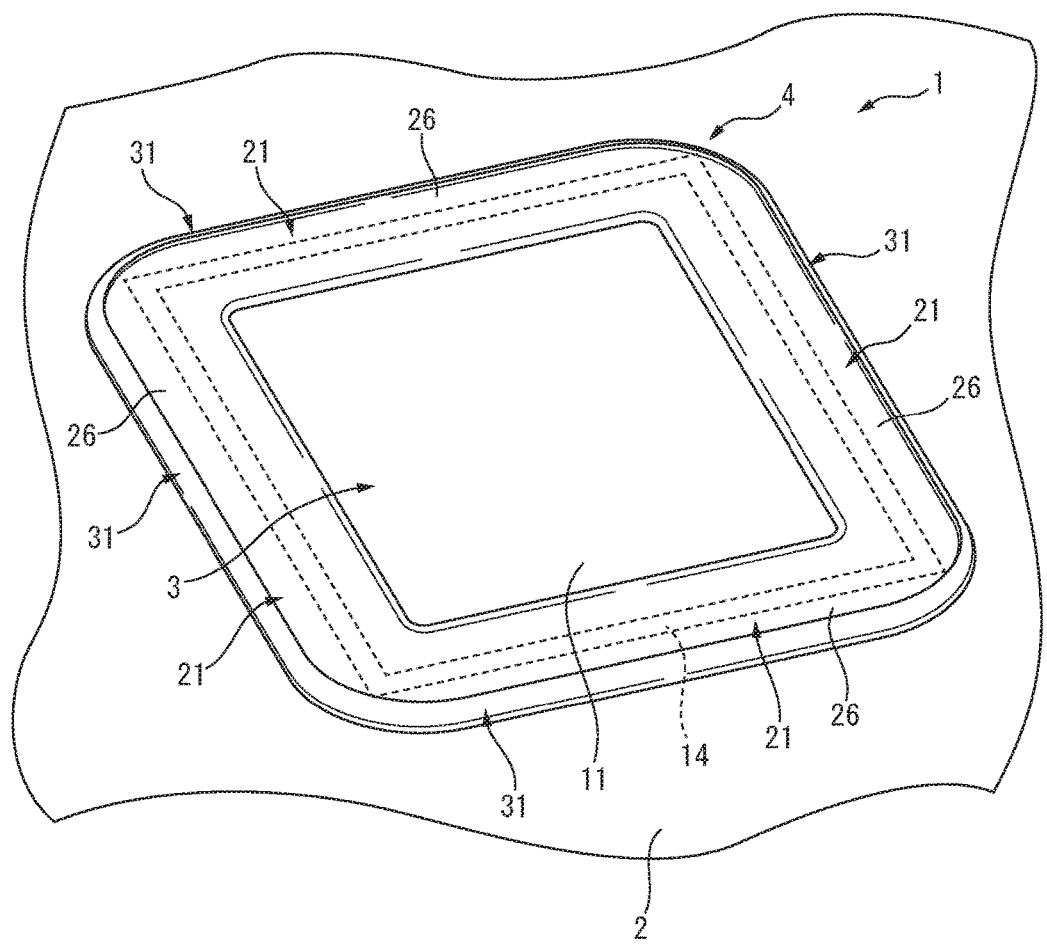
FIG. 1 is a perspective view schematically showing an embodiment of a cover member for a pet toilet sheet and a pet toilet according to the present invention.

FIG. 1 to FIG. 4 show an embodiment of a pet toilet according to the present invention, the pet toilet 1 of this embodiment comprising a pet toilet sheet 3 that absorbs excreted fluid from a pet, such as urine, and that is spread onto a floor surface 2, and a cover member 4 mounted on the toilet sheet 3, serving to press a portion of the toilet sheet 3 in a covered state.

For this embodiment, the cover member 4 is formed as an essentially square-shaped frame, in a plane view.

For the purpose of the present invention, the term "floor surface" means the actual surface of the floor, without a conventional pan-shaped tray, and for example, it includes the concept of not only a flooring or tatami mat, but also a floor surface covered with a spread mat such as a carpet, that is not part of the pet toilet.

The toilet sheet 3 comprises a liquid-permeable top sheet 11 and a liquid-impermeable back sheet 12, and a liquid-absorbing absorbent body 13 disposed between the top sheet 11 and the back sheet 12. On the top sheet 11, the toilet sheet 3 receives urine excreted by a pet such as a dog, absorbing and holding it in the absorbent body 13 after it passes through the top sheet 11.

The toilet sheet 3 of this embodiment is formed in an essentially square shape in a plane view (the shape as viewed from the top sheet side), and it has a fixed thickness direction, with the absorbent body 13 disposed between the top sheet 11 and the back sheet 12, at the center section in a plane view. Also, the construction is such that the top sheet 11 and back sheet 12 are overlaid together at the outer perimeter portions where the absorbent body 13 is not present, and mutually bonded at the overlaid portions, whereby flap sections 14 are formed as the outer perimeter of the toilet sheet 3.

Examples for the top sheet of the present invention include ones formed from nonwoven fabrics, woven fabrics, liquid-permeating hole-formed synthetic resin films and meshed net-like sheets.

Examples for the back sheet of the present invention include waterproof-treated nonwoven fabrics, films of synthetic resins (for example, polyethylene, polypropylene, polyethylene terephthalate and the like), and SMS nonwoven fabrics having highly water-resistant meltblown nonwoven fabrics sandwiched by high-strength spunbond nonwoven fabrics.

The absorbent body used for the present invention may be a water-absorbing material such as pulp or a super-absorbent material such as a water-absorbent polymer (for example, a Superabsorbent Polymer: SAP), or a material including such absorbent materials and super-absorbent materials.

The cover member 4 comprises a base section 21 having a first end 22 and a second end 23 located in the reciprocal direction, horizontally with respect to the first end 22, and an edge section 31 provided along the edge 24 of the first end 22 of the base section 21.

The construction of this embodiment is such that the base section 21 and edge section 31 extending in each direction are formed in an integral manner at the sections of the 4 sides that form the essentially square-shaped frame in a plane view. The first end 22 at one end in the widthwise direction of each base section 21 is located on the outer perimeter side of the frame, while the second end 23 nearest the first end 22, as the other end in the widthwise direction, is located on the inner perimeter side of the frame, the edge section 31 being disposed surrounding the first end 22 side of each base section 21, in a plane view.

The edge 25 of the second end 23 of the base section 21 (the inner perimeter edge of the cover member 4) and the section of the edge 24 of the first end 22 (the outer perimeter of the cover member 4) corresponding to the nearest edge 25 of the second end 23, as well as a portion of the center in the lengthwise direction of the edge section 31, extend in directions that are essentially mutually parallel.

The first ends 22 of adjacent base sections 21, 21, or their edges 24, are integrally connected in a gently curved state in a plane view. Also, the adjacent edge sections 31, 31 are integrally connected in a gently curved state in a plane view. Therefore, as shown in FIG. 1, the cover member 4 as a whole is chamfered so that its four corners are gently curved. This allows a pet such as a dog to easily place its legs onto the cover member 4 from any position.

The base section 21 has, on the top surface, an inclined surface 26 that gradually declines from the first end 22 as it approaches the nearest second end 23, serving to direct excreted fluid from the pet toward the toilet sheet 3. Thus, excreted fluid from the pet that has dropped onto the base section 21 flows down the inclined surface 26 from the first end 22 toward the second end 23, finally falling down onto the toilet sheet 3 located at the inner peripheral surface of the cover member 4, and being absorbed.

The inclined surface 26 has a first inclined section 27 that is inclined from the edge 24 of the first end 22 toward the nearest second end 23, the edge 24 of the first end 22 being connected to the edge section 31, and a second inclined section 28 located more toward the nearest second end 23 side than the first inclined section 27, and inclined to the edge 25 of the second end 23, the first end 22 side thereof being connected to the second end 23 side of the nearest first inclined section 27.

The inclined surface 26 of the base section 21 has a construction such that the inclinations of the first inclined section 27 and second inclined section 28 with respect to the horizontal plane are different from each other. Specifically, the second inclined section 28 is formed so as to have a greater inclination overall than the inclination of the first inclined section 27. In other words, the second inclined section 28 is formed with a sharper overall slope than the first inclined section 27.

The first inclined section 27 and second inclined section 28 are inclined in a mutually continuous manner.

The overall inclination of the second inclined section 28 is made greater than the inclination of the first inclined section 27 in order to ensure that excreted fluid that flows down the inclined surface 26 of the cover member 4 toward the second end 23 reliably and stably migrates down to the toilet sheet 3.

This also ensures maximal width of the inclined surface 26 between the first end 22 and the second end 23 (i.e. the size of the inclined surface 26 in the direction perpendicular to the lengthwise direction of the base section 21), so that the inclination of the inclined surface 26, and particularly the first inclined section 27, is as gentle as possible, thereby allowing the pet to have minimal fear against placing its legs on the inclined surface 26 of the cover member 4.

In other words, excreted fluid flowing down the inclined surface of the cover section toward the second end falls onto the toilet sheet at the edge of the second end; however, during such time, the excreted fluid may fail to fall from the second end onto the toilet sheet by the inclination of the inclined surface, due to its own surface tension or viscosity, and may thus remain on the cover member, potentially resulting in bad odor. Therefore, the inclined surface must have a certain degree of inclination ensured so that the excreted fluid is caused to flow down with greater energy at the second end, allowing the excreted fluid to more easily leave the edge of the second end.

If the inclination of the inclined surface 26 is too great, however, the legs of the pet will be more likely to slip onto the inclined surface 26 of the cover member 4, potentially causing the pet to fear stepping over it, so that it will not move to the inner perimeter edge side of the cover member 4 where the toilet sheet 3 is present. It is therefore essential for the inclined surface 26 to be of such a degree as to allow the pet to step in with as little fear as possible.

According to the present invention, therefore, the overall inclination of the second inclined section as the lower end of the inclined surface is made greater than the inclination of the first inclined section, so that the speed by which excreted fluid flows down is accelerated at the second inclined section and the excreted fluid can more easily leave the edge of the second end.

On the other hand, if the inclination of the first inclined section is smaller than that of the second inclined section, then a region of the inclined surface will be created in which the legs of the pet can more easily enter, thus helping to eliminate any fear of the pet with respect to the inclined surface.

Furthermore, the inclined surface 26 is formed so that the distance from the end portion of the second inclined section 28 on the first end 22 side (specifically, the end portion of the second inclined section 28 that is the connecting section with the first inclined section 27), to the edge 25 of the second end 23, is shorter than the distance from the edge 24 of the first inclined section 27 on the first end 22 to the end portion of the second end 23 (specifically, the end portion of the first inclined section 27 that is the connecting section with the second inclined section 28).

Consequently, the inclined surface 26 is formed so that the width of the second inclined section 28 (the size of the first inclined section 28 in the essentially horizontal direction that is perpendicular to the lengthwise direction of the base section 21) is shorter than the width of the first inclined section 27 (the size of the first inclined section 27 in the essentially horizontal direction perpendicular to the lengthwise direction of the base section 21).

The distance from the end portion of the second inclined section 28 on the first end 22 side to the edge 25 of the second end 23 is made shorter than the distance from the edge 24 of the first end 22 of the first inclined section 27 to the end portion on the second end 23 side for the following reason.

As explained above, the first inclined section of the inclined surface has a smaller inclination than that of the second inclined section, allowing the pet to more easily step onto the first inclined section, and the width of the first inclined section is preferably as large a region as possible for a wider footing area, considering that the pet is to step onto the cover member.

According to the present invention, therefore, making the distance from the end portion of the second inclined section on the first end side to the edge of the second end shorter than the distance from the edge of the first end of the first inclined section to the end portion on the second end side renders the first inclined section, which has the gentler inclination within the inclined surface, wider than the second inclined section, and therefore the region that can serve as a foothold for the pet can be reliably increased and the pet is able to more easily place its leg on the cover member.

For this embodiment, the first inclined section 27 is formed as an essentially flat planar shape as a whole.

The inclination of the first inclined section (the inclination with respect to the horizontal plane) will depend on the width of the first inclined section (the distance from the edge of the first end to the end portion of the second end side); however, it is preferably about 1 to 25°, more preferably about 3 to 10° and even more preferably about 4 to 6°. If the inclination is less than 1°, the viscosity and surface tension of excreted fluid from the pet may prevent the excreted fluid from flowing toward the second end side, while conversely if it is greater than 25°, the pet (particularly a dog) will notice a sharper incline of the first inclined section and may be hesitant to place its leg on the first inclined section.

Moreover, the width of the first inclined section will depend on the size of the cover member or base section; however, is preferably about 20 to 250 mm, more preferably about 40 to 150 mm and even more preferably about 60 to 80 mm. If the width of the first inclined section is less than 20 mm, it will be difficult to ensure the necessary size as a foothold for the pet to step onto the cover member, and the weight of the cover member as a whole may not be ensured (although this will depend on the material of the base section), potentially making it impossible to stably press down the toilet sheet. If it is greater than 250 mm, on the other hand, the width of the first inclined section will be too large, and the size or weight of the cover member as a whole may be greater than necessary.

As a practical example, considering a case where the base section is formed of a synthetic resin (such as polypropylene), the width of the first inclined section may be about 70 mm, in a plane view, with an inclination of about 5° with respect to the horizontal plane.

For this embodiment, the second inclined section 28 is formed as a curved shape which is curved in a convex manner upward from the end portion on the first end 22 side across the edge 25 of the second end 23.

More specifically, the second inclined section 28 of this embodiment has, on the side of the first end 22 of the base section 21, a first end side inclined section 29 having a larger inclination than the first inclined section 27, and a second end side inclined section 30 having a larger inclination with respect to the horizontal plane than the first end side inclined section 29, located more toward the side of the second end 23 of the base section 21 than the first end side inclined section 29 and extending to the edge 25 of the second end 23. In other words, the second inclined section 28 is constructed with a plurality of curved surfaces with different curvatures.

The connecting section between the first end side inclined section 29 and the second end side inclined section 30 is formed in a manner curved in a convex manner upward from the first end 22 side toward the second end 23 side, having a smooth, continuous form without a ridge or angle appearing in the inclined surface.

The second inclined section is formed in this manner with a plurality of curved surfaces including the first end side inclined section and the second end side inclined section which has a larger inclination than the first end side inclined section, in order to allow excreted fluid to easily and smoothly flow down the second inclined section.

In other words, even if the second inclined section is formed with a plurality of planes having different inclinations, the flow of excreted fluid will be poor at the section where the inclination changes. Furthermore, if the inclination of the second inclined section increases as it approaches the second end side so that excreted fluid flows down at a greater speed, then the excreted fluid will more easily leave the edge of the second end when it has fallen down onto the pet sheet.

For this embodiment, therefore, the second inclined section is formed having the first end side inclined section and the second end side inclined section as described.

The inclination of the first end side inclined section (the inclination with respect to the horizontal plane) will depend on the width of the second inclined section (the distance from the edge of the first end to the edge of the second end); however, it is preferably about 10 to 70°, more preferably about 20 to 50° and even more preferably about 25 to 30°. If the inclination is less than 10°, the viscosity and surface tension of excreted fluid from the pet may prevent the excreted fluid from dynamically flowing toward the second end side, while conversely if it is greater than 70°, the difference in the angle from that of the first inclined section will be too great, potentially resulting in liquid pooling of the excreted fluid and residue of excreted fluid on the cover member.

The inclination of the second end side inclined section (the inclination with respect to the horizontal plane), on the other hand, will depend on the width of the second inclined section and the inclination of the first end side inclined section; however, in a range of inclinations larger than the first end side inclined section, it is preferably about 20 to 90°, more preferably about 40 to 80° and even more preferably about 60 to 65°. If the inclination is less than 40°, the viscosity and surface tension of excreted fluid from the pet may prevent the excreted fluid from dynamically flowing toward the second end side, while conversely if it is greater than 90°, not only will there be no improvement in the ability of the excreted fluid to dynamically flow toward the second end side, but other disadvantages may result, such as greater effort required for morlding of the cover member itself, and the need for additional materials.

The inclinations of the first end side inclined section and second end side inclined section at the second inclined section according to the present invention are defined as the inclinations of tangent lines at the respective center points (widthwise center points) of each curved surface, of the first end side inclined section and second end side inclined section.

Also, the width of the first end side inclined section (the distance from the end portion of the first end side (specifically the end portion that is essentially the connecting section with the first inclined surface 27) to the end portion of the second end side (specifically the end portion that is the connecting section with the second end side inclined section)) is preferably about 2 to 30 mm, more preferably about 5 to 20 mm and even more preferably about 8 to 10 mm.

On the other hand, the width of the second end side inclined section (the distance from the end portion of the first end side (specifically the end portion that is the connecting section with the first end side inclined section) to the edge of the second end) will depend on the width of the first end side inclined section; however, it is preferably about 1 to 20 mm, more preferably about 2 to 10 mm and even more preferably about 3 to 5 mm. The width of the second end side inclined section is preferably smaller than the width of the first end side inclined section, which will allow the height of the cover member to be minimized while increasing the inclination on the second end side, to allow smooth movement of excreted fluid.

Moreover, the width of the second inclined section as a whole will depend on the width of the first inclined section; however, is preferably about 3 to 50 mm, more preferably about 6 to 25 mm and even more preferably about 11 to 15 mm. If the width of the second inclined section is less than 3 mm, the change in angle between the second inclined section and the first inclined section will be too large in order to maintain the inclination of the second inclined section, and this can potentially result in liquid pooling of excreted fluid. Conversely, if it is greater than 50 mm the width of the second inclined section will be too large and the inclination of the second inclined section will be too small, making it difficult for excreted fluid to leave the edge of the second end.

As a practical example, considering a case where the base section is formed of a synthetic resin (such as polypropylene), the second inclined section may have a width of about 10 mm in a plane view, the first end side inclined section may have a width of 8 mm and an inclination of about 29° with respect to the horizontal plane, and the second end side inclined section may have a width of 2 mm and an inclination of about 62° with respect to the horizontal plane.

For this inclined surface 26, the connecting section between the first inclined section 27 and the second inclined section 28 is formed so as to be curved in a convex manner upward from the first end 22 side toward the second end 23 side.

That is, the connecting section between the first inclined section 27 and the second inclined section 28 (more specifically, the end portion of the second inclined section 28 on the first end 22 side of the first end side inclined section 29) is connected so as to form a gently curved surface that is convex in the upward direction, the border section between the first inclined section 27 and the second inclined section 28 being of a form that does not have a distinct angle such as is exhibited by a ridge or crease.

Thus, the connecting section between the first inclined section 27 and the second inclined section 28 of the inclined surface 26 is formed so as to be curved in a convex manner upward from the first end 22 side toward the second end 23 side in order to prevent a reduced flow rate, or halted flow, of excreted fluid at the connecting section between the first inclined section 27 and the second inclined section 28, by the effect of surface tension of excreted fluid, such as urine.

Specifically, when an angle such as ridge is formed at the connecting section between the first inclined section and the second inclined section of the inclined surface, the surface tension or viscosity of the excreted fluid makes the excreted fluid less able to flow down the inclined surface, and in some cases the flow of excreted fluid may be halted at the connecting section. In particular, as mentioned above, the first inclined section has a smaller inclination than the second inclined section, potentially rendering outward flow from it in the second end direction less active than at the second inclined section, while also reducing the speed of any flow outward. If an angle is present at the connecting section between the first inclined section and second inclined section, the flow of excreted fluid will become unstable and may halt, leaving it to remain.

Therefore, according to the present invention, the connecting section between the first inclined section and the second inclined section of the inclined surface is formed so as to be curved in a convex manner upward from the first end side toward the second end side, thus minimizing the factor that impedes downward flow of excreted fluid on the inclined surface, and allow smooth flow of excreted fluid on the inclined surface toward the second end.

On the other hand, the edge section 31 has the section located on the first end 22 side of the base section 21 connected in an integral manner to the edge 24 of the first end 22, with an inclined surface 32 that gradually declines on the top surface side as it recedes from the first end 22 of the base section 21.

Specifically, the edge section 31 is connected to the edge 24 of the first end 22 of the base section 21, and projects outward in the direction receding from the first end 22, i.e. the direction toward the outer perimeter of the cover member 4, the top surface of the projected section being the inclined surface 32.

Figure 2:
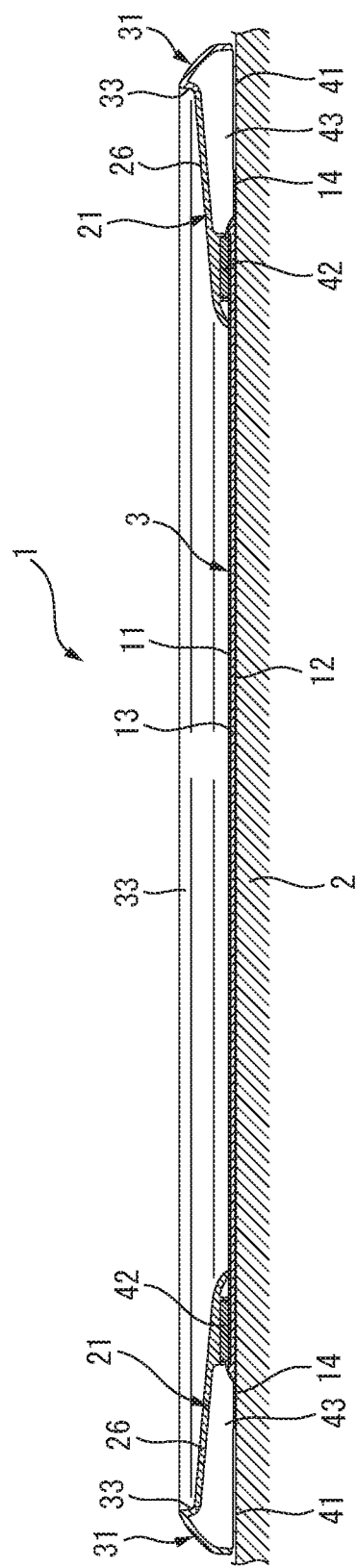
FIG. 2 is a longitudinal section diagram of FIG. 1.
Figure 3:
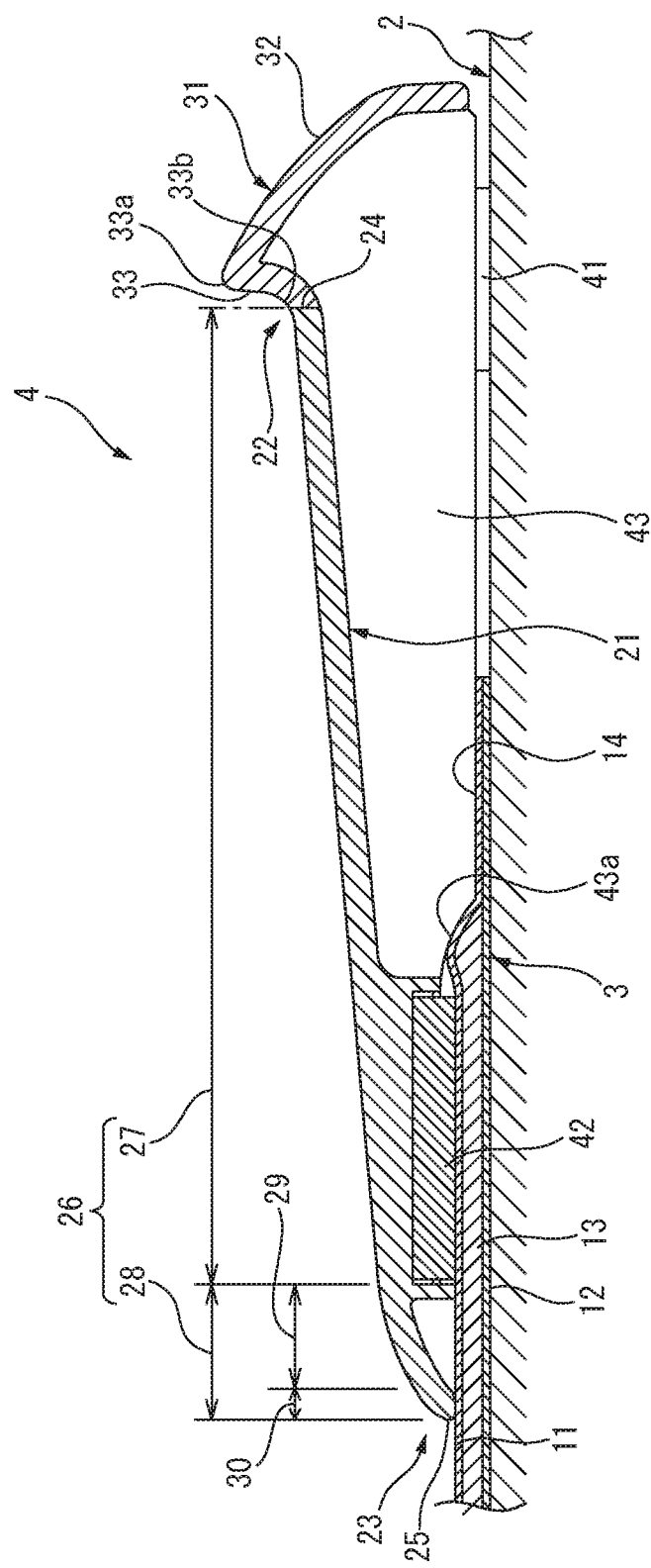
FIG. 3 is a partial end view of FIG. 2.

For this embodiment, as shown in FIG. 2 and FIG. 3, the inclined surface 32 of the edge section 31 has a relatively gentle incline with respect to the horizontal plane on the base section 21 side; however, near the section of the cover member 4 located furthest toward the outer perimeter side, the incline with respect to the horizontal plane is greater than at the base section 21 side. The inclined surface 32 of the edge section 31 is constructed in this manner in order to narrow the width of the edge section 31 as a whole while eliminating angled sections, thereby making it easier for a pet to step into or step over the cover member 4.

In the case illustrated in FIG. 2 and FIG. 3, the section of the inclined surface 32 of the edge section 31 that has the greatest inclination, i.e. the section located furthest toward the outer perimeter side of the cover member 4, is not vertical but is inclined approximately 3° with respect to the vertical direction. The inclined surface of the edge section 31 is constructed in this manner because if the outer perimeter of the cover member 4 is vertical, the vertical section will tend to cause the pet to feel a level difference between the cover member 4 and the floor surface 2, so that it may hesitate to step its leg into the cover member 4.

Furthermore, the edge section 31 has, on the first end 22 side of the base section 21, a standing wall section 33 that rises upward from the edge 24 of the first end 22 at the inclined surface 26 of the base section 21, the standing wall section 33 comprising a top edge 33a located at the furthest point upward and a base end section 33b connected to the edge of the first end 22 of the base section 21.

The standing wall section 33 serves to stably reduce halted movement of excreted fluid and fly off from the outer perimeter of the cover member 4, when excreted fluid that has fallen down onto the inclined surface 26 of the base section 21 attempts to move in the direction of the first end 22 against the incline of the inclined surface 26, depending on the energy or the direction of falling.

The top edge 33a of the standing wall section 33 is the section of the cover member 4 that is located furthest upward, and therefore it is the section of the toilet 1 located furthest upward, while the inclined section 32 of the edge section 31 extends downward in the direction away from the first end 22 of the base section 21, with the top edge 33a of the standing wall section 33 at one end.

The height of the standing wall section 33 from the base end section 33b to the top edge 33a will depend on the height of the cover member 4 as a whole; however, it is preferably about 2 to 30 mm, more preferably about 3 to 15 mm and even more preferably about 5 to 6 mm. If it is less than 2 mm, there will be a reduced effect of preventing flow of excreted fluid at the location where excreted fluid has fallen down, or of reducing its energy, while if it is greater than 30 mm, on the other hand, the standing wall section 33 will protrude too far upward causing the standing wall section 33 to stand out too far, and the pet may perceive it as an extraneous object and fail to step in or over the cover member 4.

For this embodiment, the standing wall section 33 of the edge section 31 does not stand upright in the vertical direction, but is inclined slightly toward the top edge in the direction away from the base section 21.

In the case illustrated in FIG. 2 and FIG. 3, the wall face of the standing wall section 33 is formed so as to have an inclination of approximately 3° with respect to the vertical direction. The standing wall section 33 has such an inclined construction because if the wall face of the standing wall section stands in the vertical direction, the presence of the vertical section may cause the pet to notice a significant level difference between the cover member 4 and the floor surface 2, or it may increase the sense of an extraneous object, potentially making it hesitant to step its leg into the cover member 4.

Moreover, the base end section 33b of the standing wall section 33 is connected to the edge 24 of the first end 22 of the inclined surface 26 of the base section 21, and it is formed with a curved surface, that is curved in a convex manner downward.

The base end section 33b of the standing wall section 33 is formed with a curved surface that is curved in a convex manner downward because if the base end section 33b of the standing wall section 33 and the inclined surface 26 of the base section 21 are connected in a manner that forms an essentially right angle, the right angle section will accentuate the presence of the standing wall section 33, and the presence of the standing wall section 33 will tend to be perceived as an extraneous object by the pet. This may cause the pet to hesitate to step its leg into the cover member 4, and therefore forming the base end section 33b as a curved surface that is curved in a convex manner downward helps minimize the pet's perception of the standing wall section 33 as an extraneous object.

In addition, if an angle is formed at the connecting section between the standing wall section 33 and the inclined surface 26, the viscosity or surface tension of the excreted fluid will cause the excreted fluid to pool without flowing downward at the connecting section between the standing wall section 33 and the inclined surface 26, resulting in release of bad odor, and therefore the connecting section is formed as a curved surface so that the effect of viscosity or surface tension of excreted fluid can be minimized, to allow the excreted fluid to easily flow down the inclined surface 26.

Furthermore, the edge section 31 is formed so that the distance between the connecting section of the base section 21 with first end 22 and the edge on the side opposite the first end 22 side (i.e., the outer perimeter of the cover member 4), in a plane view, is smaller than the distance between the edge 24 of the first end 22 of the base section 21 and the edge 25 of the second end 23, in a plane view. In other words, the width of the edge section 31 is formed smaller than the width of the base section 21. This will help prevent the edge section 31 from acting as an obstacle when the pet steps its leg onto the inclined surface 26 of the base section 21, while the greater width of the base section 21 will increase the possibility of the pet excreting on the inclined surface 26, thereby helping to lower the possibility of excretion on the edge section 31 and flow of the excreted fluid to the exterior.

Incidentally, the cover member 4 is formed in such a manner that the height of the cover member 4 at the location of greatest height in the vertical direction is 9 to 37% of the distance from the edge 25 of the second end 23 of the base section 21 to the edge on the side of the nearest edge section 31 opposite the first end side of the base section 21 (i.e., the nearest edge of the cover member 4). That is, the maximum height of the cover member 4 is limited to a fixed range, in terms of the distance between the inner perimeter edge of the cover member 4, i.e. the length of the base section 21 in the direction perpendicular to the lengthwise direction, which is the sum of one base section 21 and the nearest edge section 31 connected to it on the cover member 4, and the outer perimeter nearest the inner perimeter edge.

In the case of this embodiment, the location where the height in the vertical direction is greatest is the top edge 33a of the standing wall section 33 of the edge section 31, and the height from the floor surface 2 to this top edge 33a of the standing wall section 33 is 13 to 33% of the distance between the inner perimeter edge of the cover member 4 and the nearest outer perimeter.

If the height at the location where the height in the vertical direction of the cover member is greatest is less than 9% of the distance from the edge of the second end of the base section to the edge on the side of the nearest edge section opposite the first end side of the base section, then the problem of impeded flow of excreted fluid may occur. Conversely, if it is greater than 37%, a pet may tend to perceive the cover member as an extraneous object, and the resulting fear can very possibly prevent it from stepping into or over the cover member.

The height of the cover member at the location of greatest height in the vertical direction is more preferably 12 to 29%, and even more preferably 15 to 25%, of the distance from the edge of the second end of the base section to the edge of the nearest edge section on the side opposite the first end side of the base section.

Figure 4:
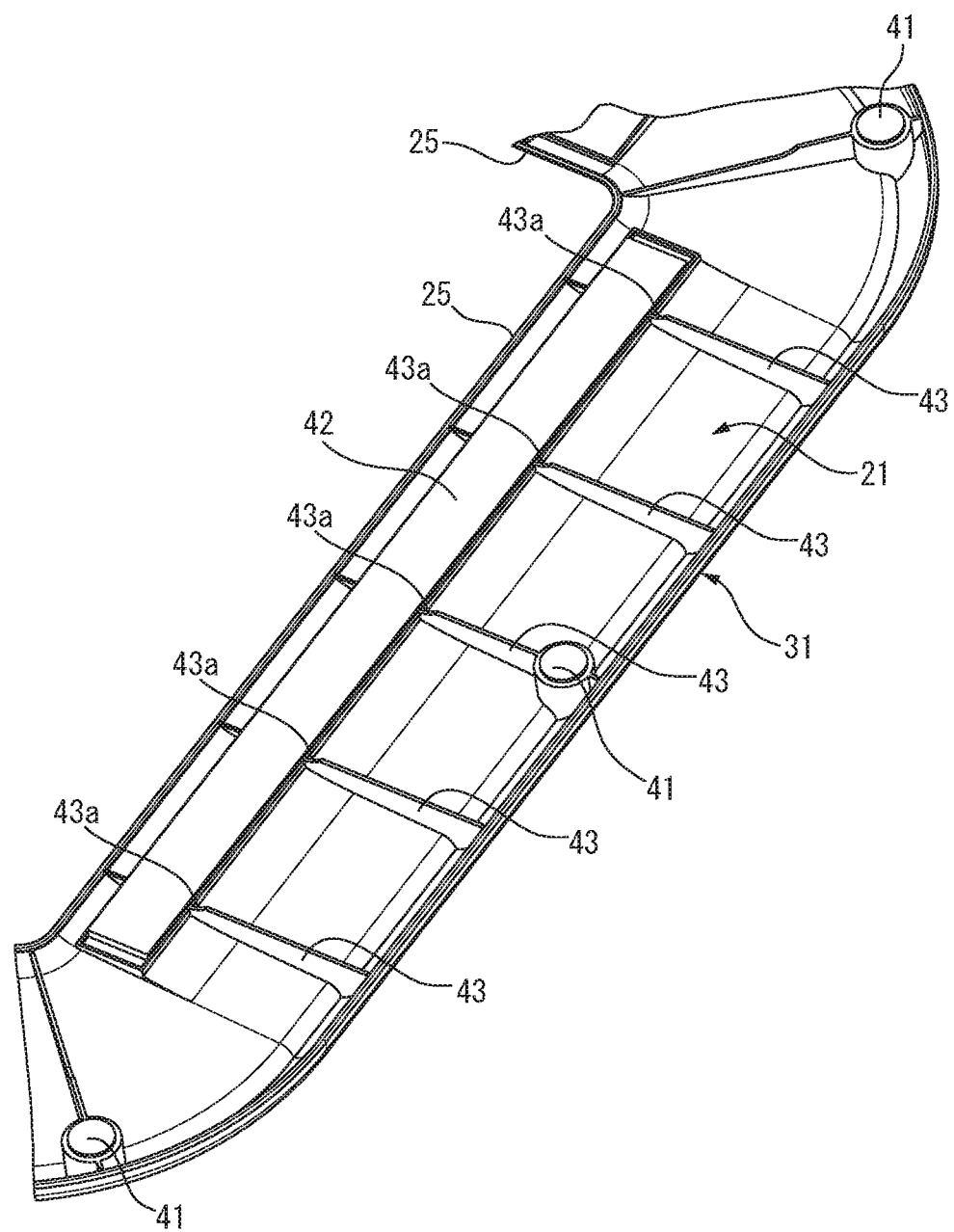
FIG. 4 is a partial magnified perspective view schematically showing a portion of the bottom side of a cover member for a pet toilet sheet according to the present invention.

Also, as shown in FIG. 3 and FIG. 4, the bottom side of the cover member 4 is provided with first members 41 that are to be points of contact of the cover member 4 against the floor surface 2, second members 42 that are to contact with the top sheet 11 of the toilet sheet 3 that is spread out on the floor surface 2 and press down the toilet sheet 3, and a plurality of ribs 43 extending from the second end 23 of the base section 21 in the direction of the nearest first end 22.

The first members 41 are cylindrical extending downward from the bottom side of the edge section 31, and for this embodiment, they extend in the vertical direction forming essentially cylindrical shapes with flat surfaces on their bottom ends. The first members 41 have their bottom ends contacting the floor surface 2 to support the cover member 4 on the floor surface 2, and to keep the cover member 4 and toilet sheet 3, i.e. the pet toilet 1, from shifting from the prescribed position on the floor surface 2 by movement of a pet. For this embodiment, the first members 41 are formed by elastic members such as rubber, so as to function to prevent slipping on the floor surface 2.

The second members 42 are formed as strips extending in the lengthwise direction of the base section 21, their top surfaces being joined to the bottom side of the base section 21. The bottom sides of the second members 42 contact the top sheet 11 of the toilet sheet 3, and more specifically the section of the top sheet 11 where the absorbent body 13 is present, allowing them to press against the toilet sheet 3. The second members 42 have the function of blocking excreted fluid that has infiltrated the bottom side of the cover member 4 through the top of the top sheet 11 of the toilet sheet 3 from the second end 23 of the base section 21, thus preventing the excreted fluid from leaking out of the toilet sheet 3 through the bottom side of the cover member 4.

For this embodiment, the second members 42 are provided as four base sections 21, each second member 42 functioning to prevent slipping against the top sheet 11, and being formed of an elastic member such as rubber with closed cells so as to block excreted fluid.

The ribs 43 serve to reinforce the cover member 4, and especially the base sections 21, while contacting with the top side of the top sheet 11 and the flap section 14 of the toilet sheet 3 for more stable pressing of the toilet sheet 3 by the cover member 4.

The ribs 43 are disposed further toward the edge section 31 side than the second members 42, with the bottom sides of the base sections 21 and edge sections 31 protruding downward. Also, the sections of the ribs 43 on the second member 42 side have recesses 43a formed in a curved upwardly convex shape, the border between the top sheet 11 and the flap section 14 being held by the curved surface of each recess 43a. That is, the upper sides of the recesses 43a are pressed against the section of the top sheet 11 in which the outer perimeter of the absorbent body 13 is present, while the bottom sides are in contact with the top surface of the flap section 14. Therefore, the recesses 43a are pressed against the sections of the top sheet 11 of the toilet sheet 3 that have level differences produced by the presence of the absorbent body 13, and the ribs 43 can stably press the toilet sheet 3 regardless of the level differences.

Thus, even when the toilet sheet 3 tends to move toward the cover member 4, such as when the pet has dashed onto the toilet sheet 3, the section of the top sheet 11 with a level difference produced by the presence of the absorbent body 13 can be pressed, preventing shifting between the cover member 4 and the toilet sheet 3. In the case of this embodiment, in particular, wherein the cover member 4 is formed in the shape of a square frame in a plane view, the curving directions (convex directions) of the recesses 43a of each of the ribs 43 of the base sections 21, 21 disposed at their opposite locations are reciprocal directions. Therefore, even if movement of the pet produces force causing the cover member 4 to move in the direction of the base section 21, the curved surfaces of the recesses 43a of the ribs 43 of the base section 21 located on the side opposite that direction become caught at the section of the top sheet 11 of the toilet sheet 3 that has a difference in level, thereby stopping movement of the cover member 4, and allowing the toilet sheet 3 to be kept even more stably pressed.

The material used to form the cover member may be, for example, a resin material such as polyethylene, polypropylene, vinyl chloride resin, polystyrene, ABS resin, AS resin, a polyester resin such as polyethylene terephthalate, polyamide resin, polycarbonate resin or acrylic resin. It may also be a metal such as stainless steel instead.

When the material for forming the cover member is a resin material it is preferably formed by injection molding; however, when the material is one other than a resin material, there is no limitation to injection molding, and instead formation by adhesion with an adhesive after cutting may be used, for an acrylic resin, or formation by welding after cutting, for a metal.

The weight of the cover member is preferably about 500 to 3000 g and more preferably about 800 g.

The inclined surface is preferably subjected to non-slip treatment, such as surface texturing, to help prevent slipping of the legs of the pet.

With the pet toilet 1 having the construction described above, the toilet sheet 3 is spread out onto a prescribed location of the floor surface 2, and the cover member 4 is used to cover a portion of the toilet sheet 3 while the bottom sides of the first members 41 are contacted against the floor surface 2. The second members 42 are contacted against the sections of the top sheet 11 of the toilet sheet 3 where the absorbent body 13 is present, with the ribs 43 against the sections of the toilet sheet 3 near the flap sections 14, so that the toilet sheet 3 is pressed by the cover member 4.

When the pet has excreted onto the inclined surface 26 of the cover member 4, the excreted fluid flows down the inclined surface 26 toward the second end 23, finally falling down onto the toilet sheet 3 and being absorbed.

The cover member 4 has an inclined surface 26 formed on the top surface of the base section 21, with the first inclined section 27 located on the first end 22 side, and a second inclined section 28 located on the second end 23 side having a larger inclination than the first inclined section 27. This allows the effects of surface tension and viscosity of the excreted fluid to be maximally eliminated, so that the excreted fluid can flow down dynamically from the inclined surface 26. As a result, the excreted fluid can stably leave the cover member 4 and fall down onto the toilet sheet 3, thereby allowing the excreted fluid to be reliably absorbed into the toilet sheet 3 so that as little of the excreted fluid as possible remains on the cover member 4.

Furthermore, the first inclined section 27 has a smaller inclination than the second inclined section 28, and the distance from the end portion of the second inclined section 28 on the first end 22 side to the edge 25 of the second end 23 is made shorter than the distance from the edge 24 of the first end 22 of the first inclined section 27 to the end portion on the second end 23 side. This allows the pet to easily step its leg into or over the cover member 4, so that it can enter and carry out excretion in the pet toilet 1 without fear.

Moreover, since the connecting section between the first inclined section 27 and the second inclined section 28 is formed so as to be curved in a convex manner upward from the first end 22 side toward the second end 23 side, excreted fluid flowing down the inclined surface 26 of the cover member 4 can be made to flow down the first inclined section and second inclined section toward the second end, while minimizing the effect of surface tension of the excreted fluid, to allow the excreted fluid to fall down more stably onto the toilet sheet.

Furthermore, since the cover member 4 is mounted on the toilet sheet 3 that has been spread onto the floor surface 2, and presses the toilet sheet 3 in a partially covered state, the height of the toilet as a whole can be more easily reduced to present less of an obstacle to entrance of a pet such as a dog into the toilet, compared to a conventional type in which the toilet sheet is mounted on a pan-shaped tray.

Although the form of the toilet sheet 3 for this embodiment is an essentially square sheet in a plane view, it may instead have any other desired form such as rectangular, triangular, circular or elliptical.

For this embodiment, the cover member 4 is formed as a square frame shape in a plane view; however, the shape of the cover member in a plane view may instead be a square U-shape or an L-shape.

This will allow the pet to enter and leave the toilet sheet through the region lacking the cover member, thereby reducing the likelihood of the pet contacting the cover member and allowing the pet to move to the toilet sheet in a relatively easy manner, while also minimizing the likelihood of shifting between the cover member and the toilet sheet, or shifting between the cover member and the floor surface. By combining two cover members that have essentially square U-shapes or L-shapes, the overall form can be made into a frame, in a plane view.

Figure 5:
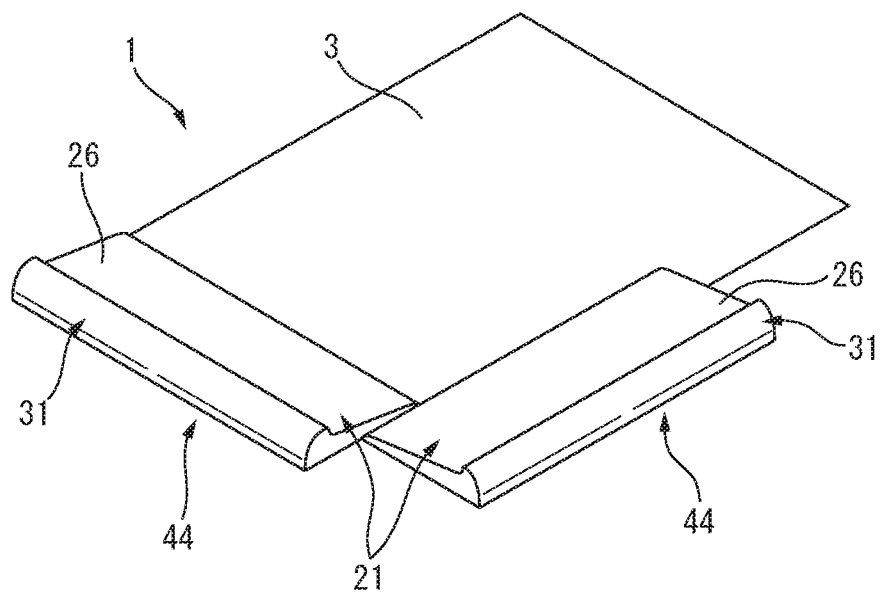
FIG. 5 is a perspective view schematically showing a different embodiment of a cover member for a pet toilet sheet according to the present invention.

Furthermore, the cover member may have an essentially straight linear shape or an essentially rectangular shape as viewed flat, as in the case of the cover member 44 shown in FIG. 5, for example, or as shown in FIG. 5, several of them may be used together to press down the toilet sheet 3 if necessary. In this case, it is important for the cover member 44 to be disposed on the toilet sheet 3 with the edge section 31 on the outer side of the toilet sheet 3 and the inclined surface 26 of the base section 21 on the inner side of the toilet sheet (for example, the center direction), as shown in FIG. 5.

This will allow the cover member to be disposed more freely in a narrow space, than when the cover member has a frame-like shape or an essentially square U-shaped or an essentially L-shaped form. In addition, since the pet will be able to enter and leave the toilet sheet through the region where no cover member is present, this reduces the likelihood of the pet contacting the cover member, and lowers the likelihood of shifting between the cover member and the toilet sheet or shifting between the cover member and the floor surface.

The cover member 44 differs from the embodiment described above only in its shape in a plane view, while having basically the same construction and effect in its other aspects, and therefore like reference numerals are assigned for these and they will not be explained in detail again.

Figure 6:
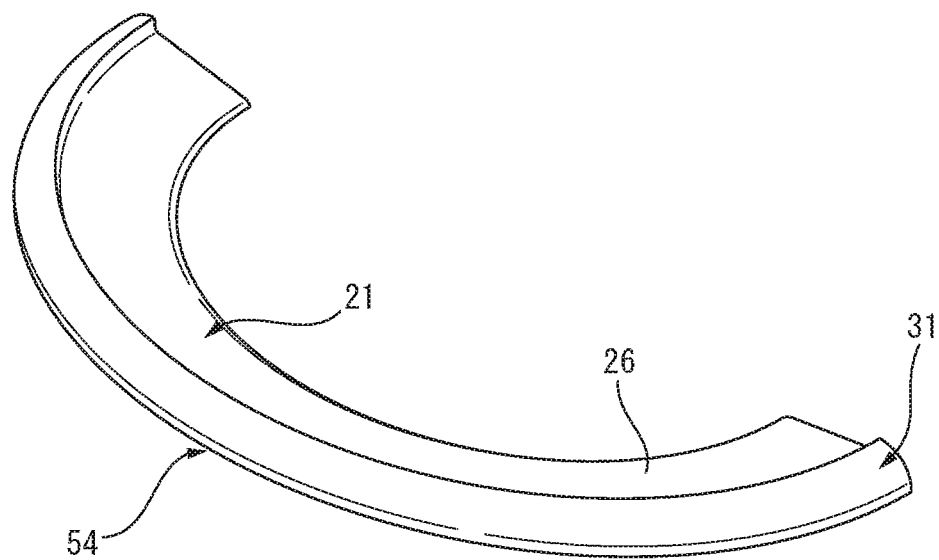
FIG. 6 is a perspective view schematically showing yet a different embodiment of a cover member for a pet toilet sheet according to the present invention.

The cover member may have an arc shape in a plane view, as with the cover member 54 shown in FIG. 6, for example. In this case, since the cover member has a rounded construction in a plane view, the pet may be expected to experience less discomfort when entering the toilet. In this case, it is important for the cover member 54 to be disposed on the toilet sheet 3 with the edge section 31 on the outer side of the toilet sheet 3 and the inclined surface 26 of the base section 21 on the inner side of the toilet sheet (for example, the center direction).

Alternatively, the cover member may have a circular frame shape (not shown) in a plane view, or two cover members 54 with arc shapes in a plane view may be used together to form an overall circular frame in a plane view.

Also, when the cover member has an arc shape in a plane view or a circular frame shape in a plane view, the shape of the toilet sheet in a plane view is preferably circular.

This cover member 5 differs from the embodiment described above in its shape in a plane view, while having basically the same construction and effect in its other aspects, and therefore like reference numerals are assigned for these and they will not be explained in detail again.

For the embodiment described above, the second inclined section 28 is formed as a curved shape which is curved in a convex manner upward from the first end 22 side of the base section 21 across the edge 25 of the second end 23; however, the second inclined section may instead be flat.

Also, the second inclined section 28 of the embodiment described above has, at the first end 22 side of the base section 21, a first end side inclined section 29 having a larger inclination than the first inclined section 27, and a second end side inclined section 30 having a larger inclination than the first end side inclined section 29, located more toward the second end 23 side of the base section 21 than the first end side inclined section 27 and extending to the edge 25 of the second end 23. However, the second inclined section may instead be constructed with a curved shape or flat shape having a fixed inclination, or with 3 or more inclined sections having mutually different inclinations.

For the embodiment described above, the edge section 31 has a standing wall section 33 on the first end 22 side of the base section 21, standing upward from the edge 24 of the first end 22 at the inclined surface 26 of the base section 21; however, the edge section does not necessarily need to have such a standing wall section.

Furthermore, the base end section 33b of the standing wall section 33 in the embodiment described above is connected to the edge 24 of the first end 22 of the inclined surface 26 of the base section 21, and is formed as a curved shape that is curved in a convex manner downward; however, if the pet is not expected to perceive the standing wall section as an extraneous object or to fear it, then the base end section does not necessarily need to have such a construction.

The edge section 31 of the embodiment described above is formed with the distance between the connecting section with the first end 22 of the base section 21, and the edge on the side opposite the first end 22, in a plane view, being smaller than the distance between the edge 24 of the first end 22 of the base section 21 and the edge 25 of the second end 23, in a plane view; however, depending on the size of the cover member as a whole, it does not necessarily need to have such a construction if the pet can easily step into the cover member, or if excreted matter is unlikely to fall onto the edge section.

REFERENCE SIGN LIST

1 Pet toilet
2 Floor surface
3 Pet toilet sheet
4, 44, 54 Cover members
21 Base section
22 First end of base section
23 Second end of base section
24 Edge of first end
25 Edge of second end
26 Inclined surface
27 First inclined section
28 Second inclined section
29 First end side inclined section
30 Second end side inclined section
31 Edge section
32 Inclined surface of edge section
33 Standing wall section
33b Base section of standing wall section

The invention claimed is:

1. A cover member for a pet toilet sheet, the cover member configured to be mounted on the pet toilet sheet that is spread over a floor surface and absorbs excreted fluid from a pet, and to press the toilet sheet in a partially covered state, the cover member comprising:

a base section having a first end and a second end located in a reciprocal direction relative to the first end in a horizontal direction, and an edge section provided along an edge of the first end of the base section, wherein the base section has, on a top surface, an inclined surface that gradually declines from the first end toward the second end, to cause movement of the excreted fluid from the pet toward the toilet sheet, the inclined surface having a first inclined section that is inclined from the edge of the first end toward the second end, the edge of the first end being connected to the edge section, and a second inclined section located more toward the second end than the first inclined section and inclined to an edge of the second end, the second inclined section having a greater inclination than the first inclined section, the second inclined section has, on a first end side of the base section, an end portion connected to the first inclined section and is curved in a convex manner upward from the first end side toward a second end side of the base section, a distance from the end portion of the second inclined section to the edge of the second end is smaller than a distance from the edge of the first end to the end portion of the second inclined section, the distance from the end portion of the second inclined section to the edge of the second end is 3 mm to 50 mm, the distance from the edge of the first end to the end portion of the second inclined section is 20 mm to 250 mm, at the edge section, a distance between an edge connected to the first end of the base section and an edge on an opposite side of the first end at an outer perimeter of the cover member, in a plan view, is smaller than a distance between the edge of the first end and the edge of the second end of the base section, in the plan view, the edge section has an inclined surface on a top surface side, that gradually declines while receding from the first end of the base section, and on the first end side of the base section, a standing wall section that rises upward from the edge of the first end at the inclined surface of the base section, the standing wall section includes a base end section connected to the edge of the first end at the inclined surface of the base section and having a curved shape that is curved in a convex manner downward, a height from the base end section to a top edge of the standing wall section is in a range of 2 mm to 30 mm, and a height of the cover member at a location where the height of the cover member in a vertical direction is greatest is 9 to 37% of a distance from the edge of the second end of the base section to the edge on the opposite side of the first end at the outer perimeter of the cover member.

2. The cover member according to claim 1, wherein the second inclined section has a curved shape that is curved in a convex manner upward from the first end of the base section across to the edge of the second end.

3. The cover member according to claim 2, wherein the second inclined section has, a first end side inclined section on the first end side of the base section and having a greater inclination than the first inclined section, and a second end side inclined section, having a greater inclination than the first end side inclined section, located more toward the second end side of the base section than the first end side inclined section, and extending up to the edge of the second end.

4. The cover member according to claim 1, wherein the standing wall section is inclined from the base end section toward the top edge, in a direction gradually receding from the base section.

5. The cover member according to claim 1, wherein the cover member is a frame in which the second end of the base section is situated at an inner perimeter of the cover member.

6. A pet toilet, comprising:

a cover member, and a pet toilet sheet having a liquid-permeable top sheet and liquid-impermeable back sheet, and a liquid-absorbing absorbent body disposed between the top sheet and back sheet, the cover member being mounted on a top surface of the pet toilet sheet, wherein a base section having a first end and a second end located in a reciprocal direction relative to the first end in a horizontal direction, and an edge section provided along an edge of the first end of the base section, wherein the base section has, on a top surface, an inclined surface that gradually declines from the first end toward the second end, to cause movement of the excreted fluid from the pet toward the toilet sheet, the inclined surface having a first inclined section that is inclined from the edge of the first end toward the second end, the edge of the first end being connected to the edge section, and a second inclined section located more toward the second end than the first inclined section and inclined to an edge of the second end, the second inclined section having a greater inclination than the first inclined section, the second inclined section has, on a first end side of the base section, an end portion connected to the first inclined section and is curved in a convex manner upward from the first end side toward a second end side of the base section, a distance from the end portion of the second inclined section to the edge of the second end is smaller than a distance from the edge of the first end to the end portion of the second inclined section, the distance from the end portion of the second inclined section to the edge of the second end is 3 mm to 50 mm, the distance from the edge of the first end to the end portion of the second inclined section is 20 mm to 250 mm, at the edge section, a distance between an edge connected to the first end of the base section and an edge on an opposite side of the first end at an outer perimeter of the cover member, in a plan view, is smaller than a distance between the edge of the first end and the edge of the second end of the base section, in the plan view, the edge section has an inclined surface on a top surface side, that gradually declines while receding from the first end of the base section, and on the first end side of the base section, a standing wall section that rises upward from the edge of the first end at the inclined surface of the base section, the standing wall section includes a base end section connected to the edge of the first end at the inclined surface of the base section and having a curved shape that is curved in a convex manner downward, a height from the base end section to a top edge of the standing wall section is in a range of 2 mm to 30 mm, and a height of the cover member at a location where the height of the cover member in a vertical direction is greatest is 9 to 37% of a distance from the edge of the second end of the base section to the edge on the opposite side of the first end at the outer perimeter of the cover member.

* * * * *